United States Patent
Go et al.

(10) Patent No.: US 9,417,059 B2
(45) Date of Patent: Aug. 16, 2016

(54) DISTANCE DETECTING DEVICE AND IMAGE PROCESSING APPARATUS INCLUDING THE SAME

(71) Applicant: LG ELECTRONICS INC., Seoul (KR)

(72) Inventors: Nakhoon Go, Seoul (KR); Yongho Cho, Seoul (KR); Sangkeun Lee, Seoul (KR); Pilwon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 13/834,256

(22) Filed: Mar. 15, 2013

(65) Prior Publication Data

US 2014/0043309 A1 Feb. 13, 2014

(30) Foreign Application Priority Data

Aug. 10, 2012 (KR) .................. 10-2012-0087891

(51) Int. Cl.
| | |
|---|---|
| *G01C 3/08* | (2006.01) |
| *G01B 11/22* | (2006.01) |
| *G06T 15/00* | (2011.01) |
| *G01S 17/89* | (2006.01) |
| *G01S 7/481* | (2006.01) |
| *G01S 17/10* | (2006.01) |
| *G01S 17/36* | (2006.01) |

(52) U.S. Cl.
CPC ............... *G01B 11/22* (2013.01); *G01S 7/4815* (2013.01); *G01S 7/4817* (2013.01); *G01S 17/89* (2013.01); *G06T 15/00* (2013.01); *G01S 17/105* (2013.01); *G01S 17/36* (2013.01)

(58) Field of Classification Search
CPC .................................. G01B 11/22; G06T 15/00
See application file for complete search history.

(56) References Cited

U.S. PATENT DOCUMENTS

| | | | | |
|---|---|---|---|---|
| 6,269,302 B1 * | 7/2001 | Yoshida | ................... | G01S 3/48 340/928 |
| 2001/0035952 A1 * | 11/2001 | Merklein | ................... | 356/239.2 |
| 2006/0017939 A1 * | 1/2006 | Jamieson et al. | ............ | 356/622 |
| 2007/0296972 A1 * | 12/2007 | Lounis et al. | ................ | 356/364 |
| 2009/0052288 A1 | 2/2009 | Eno et al. | ................... | 369/53.11 |

(Continued)

FOREIGN PATENT DOCUMENTS

| | | | |
|---|---|---|---|
| DE | 10 2006 052 770 A1 | | 5/2008 |
| EP | 1 480 006 A2 | | 11/2004 |

(Continued)

OTHER PUBLICATIONS

European Search Report dated Nov. 11, 2014 issued Application No. 13 002 308.8.

*Primary Examiner* — Luke Ratcliffe
*Assistant Examiner* — Samantha K Abraham
(74) *Attorney, Agent, or Firm* — KED & Associates, LLP

(57) ABSTRACT

A distance detecting device and an image processing apparatus including the same are disclosed. The distance detecting device includes a first light source to output a first output beam and a second light source to output a second output beam having a wavelength different from that of the first output beam, a scanner to progressively perform first directional scanning and second directional scanning to output the first output beam and the second output beam to an outside, a first detecting unit to convert a first received beam corresponding to the first output beam into a first electric signal, a second detecting unit to convert a second received beam corresponding to the second output beam into a second electric signal, and a controller to detect a distance from an external target based on the first electric signal and the second electric signal.

11 Claims, 14 Drawing Sheets

(56) References Cited

U.S. PATENT DOCUMENTS

2010/0271615 A1* 10/2010 Sebastian et al. ............ 356/4.01
2011/0006943 A1* 1/2011 Shaffer ................. G01S 17/933
                                                      342/146
2012/0105859 A1* 5/2012 Heo et al. ...................... 356/456

FOREIGN PATENT DOCUMENTS

| EP | 1 480 009 A2 | 11/2004 |
| EP | 1480009 A2 * | 11/2004 |
| EP | 1 610 091 A1 | 12/2005 |
| EP | 2 447 666 A2 | 5/2012 |

* cited by examiner

DISTANCE DETECTING DEVICE AND IMAGE PROCESSING APPARATUS INCLUDING THE SAME

CROSS-REFERENCE TO RELATED APPLICATION

This application claims the priority benefit of Korean Patent Application No. 10-2012-0087891, filed on Aug. 10, 2012 in the Korean Intellectual Property Office, the disclosure of which is incorporated herein by reference.

BACKGROUND OF THE INVENTION

1. Field of the Invention

The present invention relates to a distance detecting device and an image processing apparatus including the same, and more particularly to a distance detecting device that is capable of easily detecting the distance from an external target and an image processing apparatus including the same.

2. Description of the Related Art

A request to measure the distance from an external target has been increased. In particular, a request to view a three-dimensional (3D) image, i.e. a stereoscopic image, in addition to a two-dimensional (2D) image has been increased. The distance from an external target may be detected to detect the depth of a 3D image. Various methods of detecting the distance from an external target have been tried.

SUMMARY OF THE INVENTION

It is an object of the present invention to provide a distance detecting device that is capable of easily detecting the distance from an external target and an image processing apparatus including the same.

In accordance with one aspect of the present invention, the above and other objects can be accomplished by the provision of a distance detecting device including a first light source to output a first output beam and a second light source to output a second output beam having a wavelength different from that of the first output beam, a scanner to progressively perform first directional scanning and second directional scanning to output the first output beam and the second output beam to an outside, a first detecting unit to convert a first received beam corresponding to the first output beam into a first electric signal, a second detecting unit to convert a second received beam corresponding to the second output beam into a second electric signal, and a controller to detect a distance from an external target based on the first electric signal and the second electric signal.

In accordance with another aspect of the present invention, there is provided a distance detecting device including a first light source to output a first output beam and a second light source to output a second output beam having a wavelength identical to that of the first output beam and a polarization direction different from that of the first output beam, a scanner to progressively perform first directional scanning and second directional scanning to output the first output beam and the second output beam to an outside, a light receiving unit to receive a first received beam and a second received beam corresponding to the first output beam and the second output beam from the outside, a first detecting unit to convert the first received beam into a first electric signal, a second detecting unit to convert the second received beam into a second electric signal, and a controller to detect a distance from an external target based on the first electric signal and the second electric signal.

In accordance with another aspect of the present invention, there is provided an image processing apparatus including a display unit, a distance detecting unit including a first light source to output a first output beam and a second light source to output a second output beam having a wavelength different from that of the first output beam, a scanner to progressively perform first directional scanning and second directional scanning to output the first output beam and the second output beam to an outside, a first detecting unit to convert a first received beam corresponding to the first output beam into a first electric signal, and a second detecting unit to convert a second received beam corresponding to the second output beam into a second electric signal, the distance detecting unit being configured to detect a distance from an external target based on the first electric signal and the second electric signal, and a controller to control the display unit to display a 3D image using distance information detected by the distance detecting unit.

In accordance with yet another aspect of the present invention, there is provided an image processing apparatus including a display unit, a distance detecting unit including a first light source to output a first output beam and a second light source to output a second output beam having a wavelength identical to that of the first output beam and a polarization direction different from that of the first output beam, a scanner to progressively perform first directional scanning and second directional scanning to output the first output beam and the second output beam to an outside, a light receiving unit to receive a first received beam and a second received beam corresponding to the first output beam and the second output beam from the outside, a first detecting unit to convert the first received beam into a first electric signal, and a second detecting unit to convert the second received beam into a second electric signal, the distance detecting unit being configured to detect a distance from an external target based on the first electric signal and the second electric signal, and a controller to control the display unit to display a 3D image using distance information detected by the distance detecting unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described in detail with reference to the accompanying drawings.

An image processing apparatus as described in this specification may be an apparatus in which a distance detecting device can be mounted. The image processing apparatus may include a mobile terminal, a television (TV), a set-top box, a media player, a game console, and monitoring camera. Also, the image processing apparatus may include electric home appliances, such as an air conditioner, a refrigerator, a washing machine, a cooking utensil, and a robot cleaner. In addition, the image processing apparatus may include vehicles, such as a bicycle and a car.

Meanwhile, a mobile terminal may include a mobile phone, a smart phone, a laptop computer, a digital broadcast terminal, a personal digital assistant (PDA), a portable multimedia player (PMP), a digital camera, a navigator, a tablet computer, and an e-book terminal.

The terms "module" and "unit," when attached to the names of components, are used herein to help the understanding of the components and thus they should not be considered as having specific meanings or roles. Accordingly, the terms "module" and "unit" may be used interchangeably.

Figure 1:
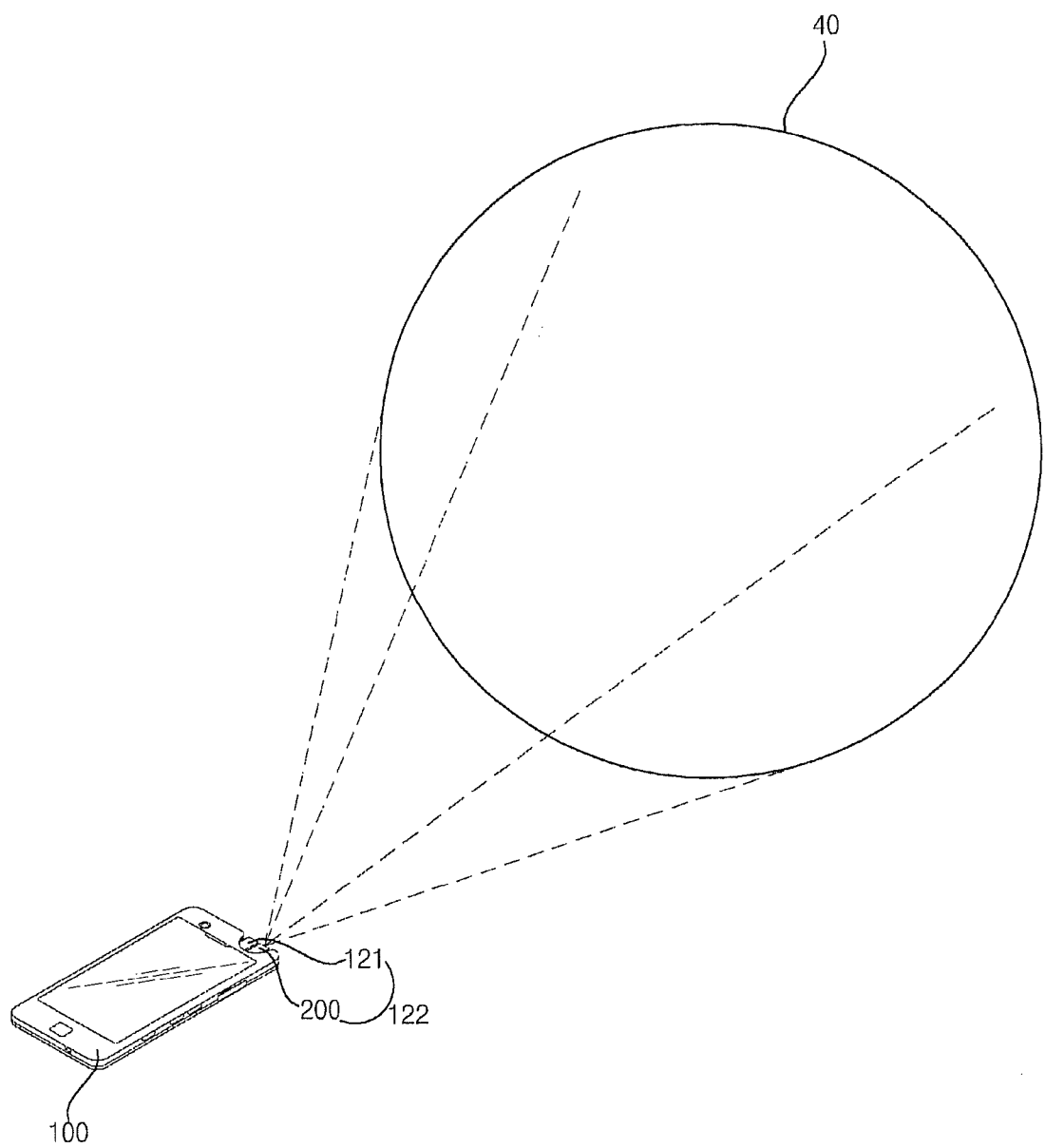
FIG. 1 is a view showing that light for distance detection is projected from an image processing apparatus including a distance detecting device according to an embodiment of the present invention.

FIG. 1 is a view showing that light for distance detection is projected from an image processing apparatus including a distance detecting device according to an embodiment of the present invention.

Referring to FIG. 1, a mobile terminal 100 is shown as an example of the image processing apparatus. As previously described, a distance detecting device 200 may be mounted in an image processing apparatus, such as a mobile terminal, a TV, a set-top box, a media player, a game console, electric home appliances, and vehicles. Hereinafter, a description will be given based on the mobile terminal 100.

The mobile terminal 100 may include a camera 121 for capturing an image. Also, the mobile terminal 100 may include a distance detecting device 200 for capturing a three-dimensional (3D) image.

The camera 121 for acquiring an image of an external target 40 and the distance detecting device 200 for acquiring information regarding the distance from the external target 40 may be provided in a 3D camera 122. The 3D camera 122 may be a module including the camera 121 and the distance detecting device 200.

Alternatively, the camera 121 and the distance detecting device 200 may be mounted in the mobile terminal 100 as separate modules.

In this embodiment, the distance detecting device 200 outputs a plurality of output beams to the external target 40 using a plurality of light sources to output beams of different wavelengths, receives a plurality of received beams scattered or reflected by the external target 40, and detects a distance using the difference between the output beams and the received beams. In particular, a two-dimensional (2D) scanner capable of progressively performing first directional scanning and second directional scanning is used to output a plurality of output beams to the external target 40. Consequently, it is not necessary to use a plurality of scanners, and therefore, it is possible to miniaturize the distance detecting device 200. Also, it is possible to reduce manufacturing cost. A scanner and other components will hereinafter be described with reference to FIG. 2A.

Figure 2A:
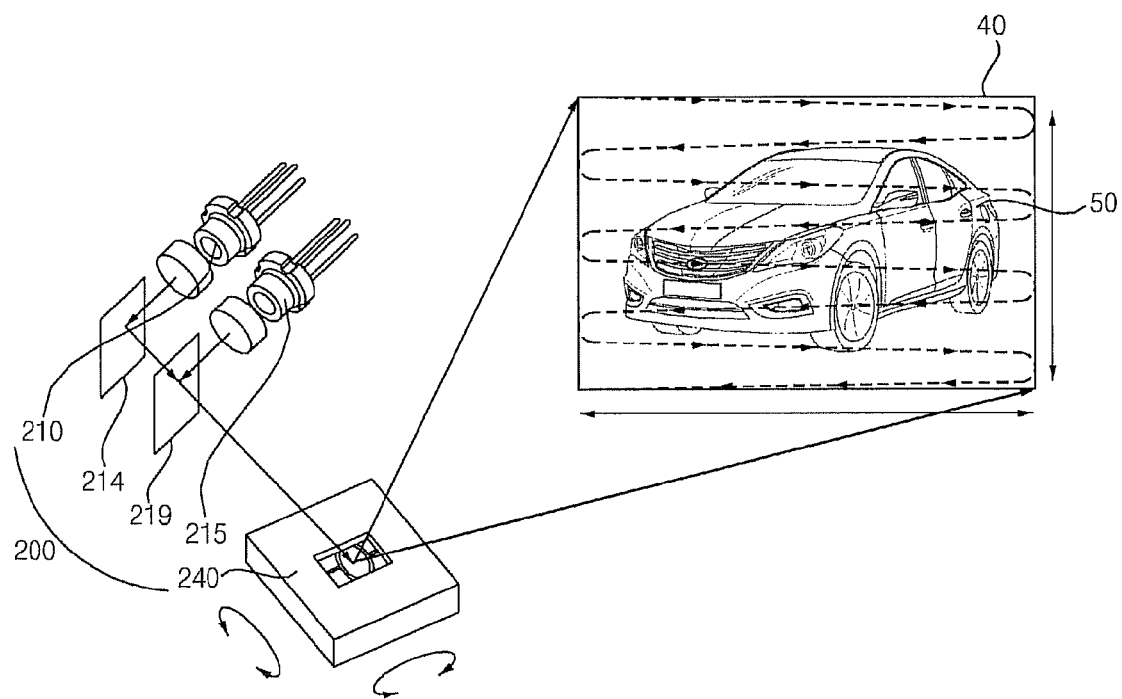
FIG. 2A is a view illustrating a scanning method when light is projected from the distance detecting device of FIG. 1.

FIG. 2A is a view illustrating a scanning method when light is projected from the distance detecting device of FIG. 1.

Referring to FIG. 2A, the distance detecting device 200 may include a first light source 210, a second light source 215, a light reflecting unit 214, a light wavelength splitting unit 219, and a scanner 240.

In FIG. 2A, the number of wavelengths of light output from the distance detecting device 200 is illustrated as being 2. Accordingly, the first light source 210 and the second light source 215, which outputs beams of different wavelengths, are illustrated.

The first light source 210 and the second light source 215 may output beams of infrared wavelengths as beams of different wavelengths. However, the present invention is not limited thereto. For example, the first light source 210 and the second light source 215 may output beams of visible wavelengths. Hereinafter, a description will be given based on beams of infrared wavelengths.

When the intensity of light output from a light source is increased, the visual power of a person, as the external target, may be lowered due to the light incident upon eyes of the person. On the other hand, when the intensity of light output from the light source is decreased, the light is scattered or reflected by the external target, and therefore, the intensity of light received by the distance detecting device 200 may be decreased. As a result, accuracy in information regarding the distance from the external target detected based on the difference between the output light and the received light may be lowered. In this embodiment, a plurality of light sources is used to prevent lowering in visual power of a person and to improve accuracy in detection of information regarding the distance from the external target, thereby solving the above problems.

As shown in FIG. 2A, therefore, two light sources may be used. However, various numbers of light sources may also be used.

When light from the first light source 210 and the second light source 215 is projected to the external target, it is important to collimate light. To this end, a laser diode may be used. However, the present invention is not limited thereto. Various examples may be possible.

The first light source 210 and the second light source 215 may simultaneously output beams of different wavelengths.

A first output beam output from the first light source 210 may be reflected by the light reflecting unit 214, transmitted through the light wavelength splitting unit 219, and incident upon the scanner 240. On the other hand, a second output beam output from the second light source 215 may be reflected by the light wavelength splitting unit 219 and incident upon the scanner 240.

The light wavelength splitting unit 219 may reflect or transmit light based on wavelengths of the light. The light wavelength splitting unit 219 may be realized by, for example, a dichroic mirror. If the wavelength of the first output beam output from the first light source 210 is shorter than that of the second output beam output from the second light source 215, the light wavelength splitting unit 219 may transmit the first output beam of the shorter wavelength and reflect the second output beam of the longer wavelength.

Meanwhile, the scanner 240 may receive the first output beam from the first light source 210 and the second output beam from the second light source 215 and progressively and repeatedly perform first directional scanning and second direction scanning to the outside.

As shown in FIG. 2A, the scanner 240 perform horizontal scanning from left to right, vertical scanning from top to bottom, horizontal scanning from right to left, and vertical scanning from top to bottom with respect to the external target 40 within a region that can be scanned. This scanning operation is repeatedly performed with respect to the entirety of the external target 40.

Meanwhile, the first output beam and the second output beam output to the external target 40 may be scattered or reflected by the external target 40 and incident upon the distance detecting device 200. For example, the scanner 240 may receive the first received beam corresponding to the first output beam and the second received beam corresponding to the second output beam.

The distance detecting device 200 may detect a distance based on the difference between the first and second output beams and the first and second received beams. A distance detection method will hereinafter be described with reference to FIG. 5A and the following drawings.

Figure 2B:
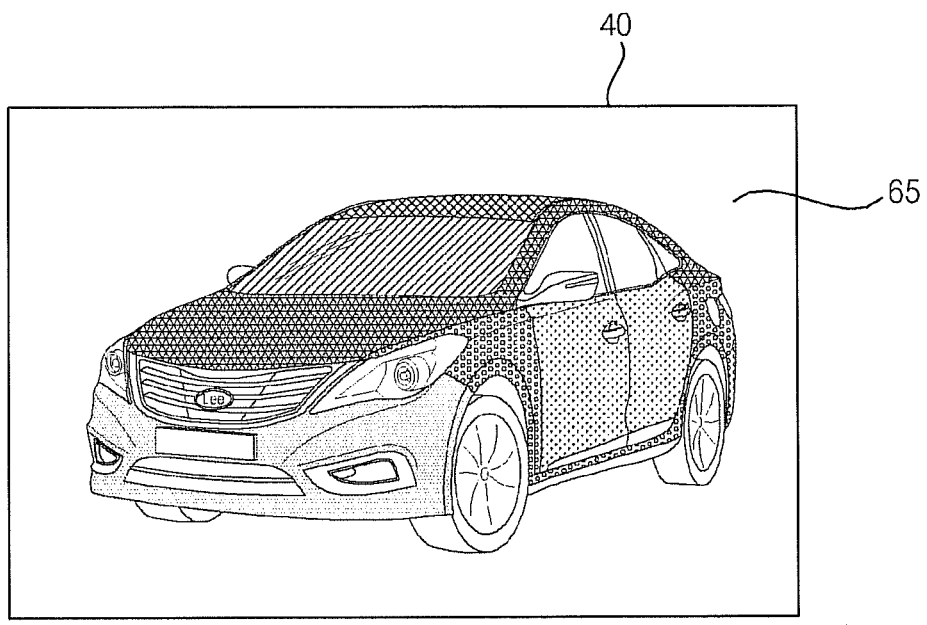
FIG. 2B is a view illustrating distance information that can be obtained by the distance detecting device of FIG. 1.

Meanwhile, distance information calculated by the distance detecting device 200 may be expressed as a brightness image 65 as shown in FIG. 2B. Various distance values of the external target 40 may be indicated as corresponding brightness levels. In case of a short distance, a brightness level may be high (bright). In case of a long distance, a brightness level may be low (dark).

Figure 3:
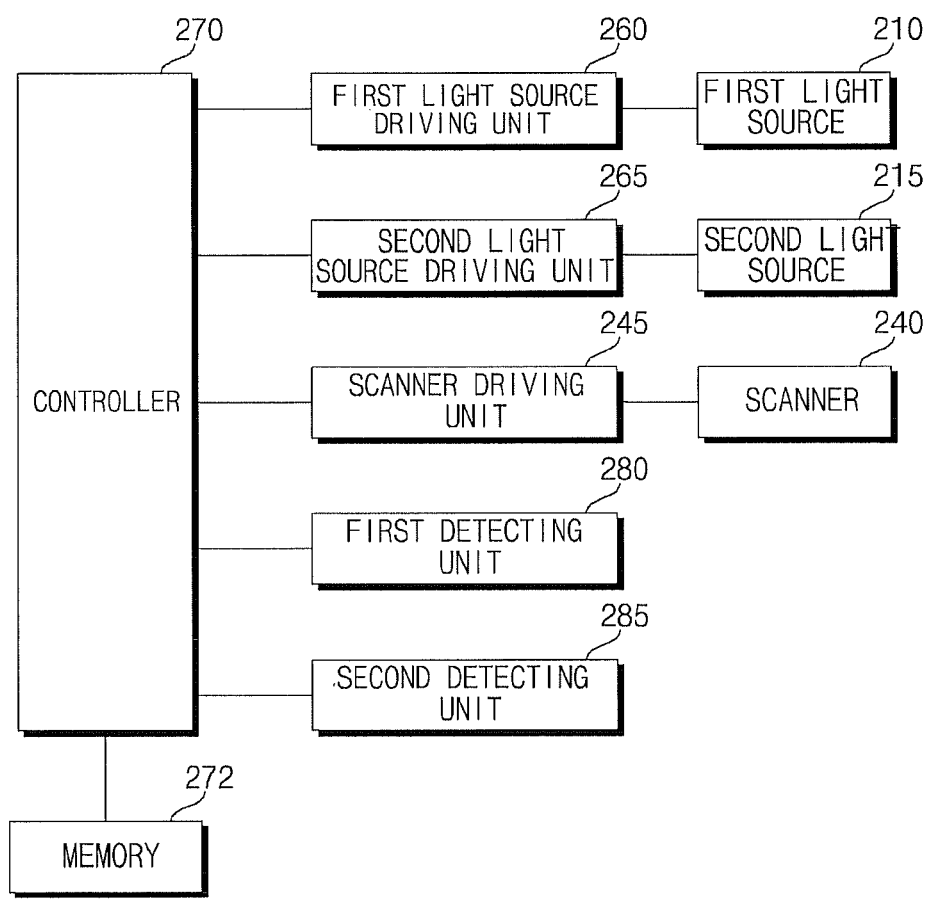
FIG. 3 is a block diagram showing the internal structure of the distance detecting device of FIG. 1.

FIG. 3 is a block diagram showing the internal structure of the distance detecting device of FIG. 1.

Referring to FIG. 3, the distance detecting device 200 may include a first light source 210, a second light source 215, a scanner 240, a first light source driving unit 260, a second light source driving unit 265, a scanner driving unit 245, a controller 270, a memory 272, a first detecting unit 280, and a second detecting unit 285.

The first light source 210 and the second light source 215 output beams of different wavelengths. The first light source 210 may output a first output beam of a first wavelength, and the second light source 215 output a second output beam of a second wavelength.

The first light source driving unit 260 may drive the first light source 210 according to a control signal of the controller 270. For example, when the distance detecting device 200 is operated, the first light source driving unit 260 may output a pulse signal to the first light source 210. Meanwhile, a pulse amplitude modulation (PAM) type or pulse width modulation (PWM) type pulse signal may be applied to the first light source 210. As a result, the intensity of light output from the first light source 210 may be decided.

Meanwhile, the second light source driving unit 265 may drive the second light source 215 according to a control signal of the controller 270 in a manner similar to the first light source driving unit 260. For example, when the distance detecting device 200 is operated, the second light source driving unit 265 may output a pulse signal to the second light source 215.

As previously described, the scanner 240 may receive the first output beam from the first light source 210 and the second output beam from the second light source 215 and progressively and repeatedly perform first directional scanning (horizontal scanning) and second direction scanning (vertical scanning) to the outside.

The scanner driving unit 245 may control the horizontal scanning and the vertical scanning of the scanner 240. For example, the scanner driving unit 245 may control the horizontal scanning and the vertical scanning to be performed with respect to a scanning region of the external target 40.

Meanwhile, the scanner driving unit 245 may generate a feedback signal of the horizontal scanning and a feedback signal of the vertical scanning and transmit the generated feedback signals to the controller 270. The controller 270 may control the scanner driving unit 245 based on the feedback signals so that no error is generated during scanning of the scanner 240.

The first detecting unit 280 converts a first received beam received from the external target 40 into a first electric signal. To this end, the first detecting unit 280 may include a photodiode to convert an optical signal into an electric signal. In particular, the first detecting unit 280 may include a photodiode exhibiting a high photoelectric efficiency, such as an Avalanche photodiode to convert a weak beam scattered by the external target 40 and received from the external target 40 into voltage.

The second detecting unit 285 converts a second received beam received from the external target 40 into a second electric signal in a manner similar to the first detecting unit 280. However, the second detecting unit 285 receives a second received beam, which has a wavelength different from that of the first received beam, and converts the second received beam into a second electric signal unlike the first detecting unit 280. To this end, the second detecting unit 285 may include a photodiode, particularly an Avalanche photodiode.

The controller 270 controls operations of the first light source driving unit 260, the second light source driving unit 265, and the scanner driving unit 245.

Meanwhile, the controller 270 receives the first electric signal and the second electric signal from the first detecting unit 280 and the second detecting unit 285 and calculates the distance from the external target 40 based thereupon.

Specifically, the controller 270 may calculate first distance information using the difference between the electric signal of the first output beam and the first electric signal of the first received beam. In particular, 2D scanning is progressively performed with respect to the external target 40, and therefore, first distance information regarding each specific region of the external target 40 may be progressively calculated.

On the other hand, the controller 270 may calculate second distance information using the difference between the electric signal of the second output beam and the second electric signal of the second received beam. In particular, 2D scanning is progressively performed with respect to the external target 40, and therefore, second distance information regarding each specific region of the external target 40 may be progressively calculated.

Finally, the controller 270 may final distance information regarding each region of the external target using the calculated first distance information and second distance information.

As another example, the controller 270 may add the electric signal of the first output beam and the electric signal of the second output beam, add the first electric signal of the first received beam and the second electric signal of the second received beam, and calculate distance information using the difference between the added electric signals of the output beams and the added electric signals of the received beams. In particular, 2D scanning is progressively performed with respect to the external target 40, and therefore, distance information regarding each specific region of the external target 40 may be progressively calculated as final distance information.

The memory 272 may store data necessary to control various operations of the distance detecting device 200. In particular, the memory 272 may store the electric signal of the first output beam and the electric signal of the second output beam and output the stored electric signal to the controller 270 for distance calculation.

Also, the memory 272 may store distance information regarding each specific region of the external target 40 when distance from the external target 40 is calculated and finally store distance information regarding the entirety of the external target 40.

Figure 4:
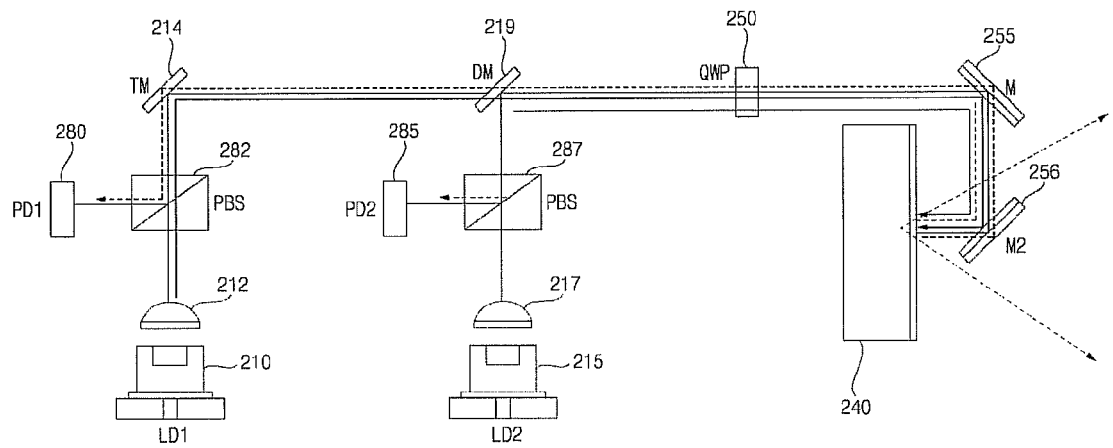
FIG. 4 is a view showing the internal structure of a distance detecting device according to an embodiment of the present invention.

FIG. 4 is a view showing the internal structure of a distance detecting device according to an embodiment of the present invention.

Referring to FIG. 4, the distance detecting device may include a first light source 210, a first condensing unit 212, a light reflecting unit 214, a second light source 215, a second condensing unit 217, a light wavelength splitting unit 219, a scanner 240, a polarized beam converting unit 250, a second light reflecting unit 255, a third light reflecting unit 256, a first detecting unit 280, a first polarized beam splitting unit 282, a second detecting unit 285, and a second polarized beam splitting unit 287.

Hereinafter, a description will be given based on the other units excluding the units (the first light source 210, the second light source 215, the scanner 240, the first detecting unit 280, and the second detecting unit 285) described with reference to FIG. 3.

The first condensing unit 212 and the second condensing unit 217 collimate output beams output from the first light source 210 and the second light source 215, respectively. To this end, the first condensing unit 212 and the second condensing unit 217 may include collimate lenses to collimate the beams of the corresponding wavelengths.

The first output beam, having passed through the first condensing unit 212, passes through the first polarized beam splitting unit 282.

In a case in which the first output beam and the first received beam of the same wavelength have different polarized beams, the first polarized beam splitting unit 282 splits advancing directions of the first output beam and the first received beam according to the polarized beam directions thereof. For example, in a case in which the first output beam is an output beam of a P polarized state, the first polarized beam splitting unit 282 transmits the first output beam, and, in a case in which the first reflected beam is a received beam of an S polarized state, the first polarized beam splitting unit 282 reflects the first reflected beam. Afterward, the first polarized beam splitting unit 282 transmits the first received beam to the first detecting unit 280. This polarized beam splitting unit may be called a polarized beam splitter.

On the other hand, the second polarized beam splitting unit 287 is operated in a manner similar to the first polarized beam splitting unit 282. That is, in a case in which the second output beam and the second received beam of the same wavelength have different polarized beams, the first polarized beam splitting unit 282 splits advancing directions of the second output beam and the second received beam according to the polarized beam directions thereof. For example, in a case in which the second output beam is an output beam of a P polarized state, the second polarized beam splitting unit 287 transmits the second output beam, and, in a case in which the second reflected beam is a received beam of an S polarized state, the second polarized beam splitting unit 287 reflects the second reflected beam. Afterward, the second polarized beam splitting unit 287 transmits the second received beam to the second detecting unit 285.

The light reflecting unit 214 reflects the first output beam having passed through the first polarized beam splitting unit 282 to the scanner 240 and reflects the first received beam received through the scanner 240 to the first polarized beam splitting unit 282. The light reflecting unit 214 may reflect beams of different wavelengths in addition to the first output beam. To this end, the light reflecting unit 214 may include a total mirror.

The light wavelength splitting unit 219 may reflect or transmit light on a per wavelength basis. For example, the light wavelength splitting unit 219 may be realized by a dichroic mirror. Specifically, the light wavelength splitting unit 219 may transmit a beam of a first wavelength and reflect a beam of a second wavelength.

Consequently, the light wavelength splitting unit 219 may transmit the first output beam to the scanner 240 and reflect the second output beam to the scanner 240.

Also, the light wavelength splitting unit 219 may transmit the first received beam to the light reflecting unit 214 and reflect the second received beam to the second polarized beam splitting unit 287.

The polarized beam converting unit 250 may convert polarization directions of the output beams and polarization directions of the received beams.

For example, the polarized beam converting unit 250 may provide phase difference to control the polarization directions. The polarized beam converting unit 250 may convert a linearly polarized beam into a circularly polarized beam or a circularly polarized beam into a linearly polarized beam.

Specifically, the polarized beam converting unit 250 converts the first and second output beams, which are P polarized beams, into first and second output beams of circularly polarized beams. Consequently, the scanner 240 may output the first and second output beams of circularly polarized beams to the outside and receive first and second received beams of circularly polarized beams from the outside. On the other hand, the polarized beam converting unit 250 converts the first and second received beams of circularly polarized beams received through the scanner 240 into first and second received beams of S polarized beams. Consequently, the polarized beam converting unit 250 may be called a quarter wavelength plate.

As another example, the polarized beam converting unit 250 may output the first and second output beams of P polarized beam without conversion and convert the first and second received beams of P polarized beams received from the scanner 240 into first and second received beams of S polarized beams.

The second light reflecting unit 255 reflects the first output beam having passed through the polarized beam converting unit 250 to the scanner 240 and reflects the first and second received beams received through the scanner 240 to the polarized beam converting unit 250. The second light reflecting unit 255 may reflect beams of different wavelengths in addition to the first and second output beams. To this end, the second light reflecting unit 255 may include a total mirror.

The third light reflecting unit 256 reflects the first and second output beams having passed through the second light reflecting unit 255 to the scanner 240 and reflects the first and second received beams received through the scanner 240 to the second light reflecting unit 255. The third light reflecting unit 256 may reflect beams of different wavelengths in addition to the first and second output beams. To this end, the third light reflecting unit 256 may include a total mirror.

Meanwhile, in the distance detecting device of FIG. 4, an optical path of the first and second output beams and an optical path of the first and second received beams may partially overlap. A distance detecting device configured to have a structure in which an optical path of output beams and an optical path of received beams are partially overlap may be called a coaxial optical system. This distance detecting device may have a compact size, may be strong against external light, and may exhibit a high signal to noise ratio.

On the other hand, the optical path of the first and second output beams and the optical path of the first and second received beams may be completely separated from each other. A distance detecting device configured to have a structure in which an optical path of output beams and an optical path of received beams are completely separated from each other may be called a separated optical system, which will hereinafter be described with reference to FIG. 7.

Figure 5A:
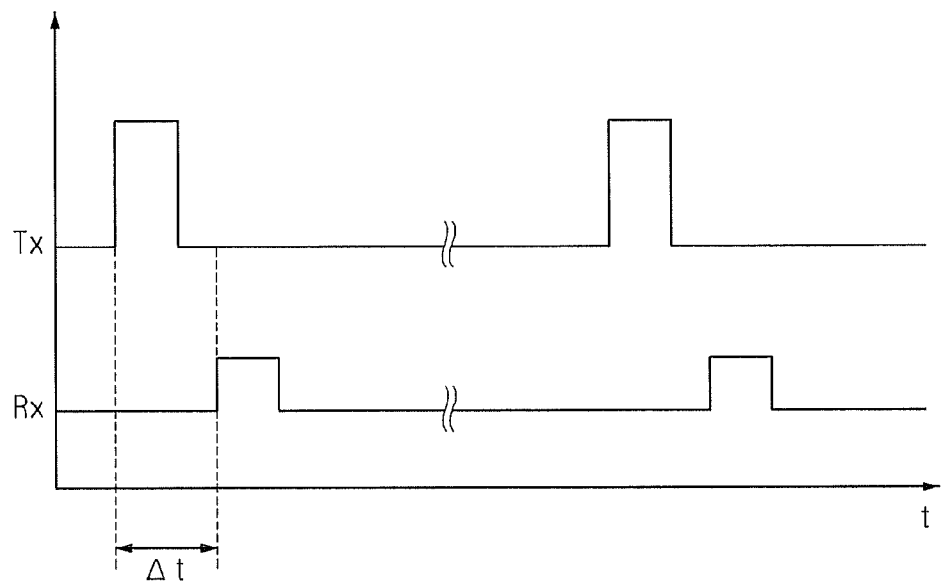
FIGS. 5A and 5B are views illustrating a distance detecting method of the distance detecting device of FIG. 3.
Figure 5B:
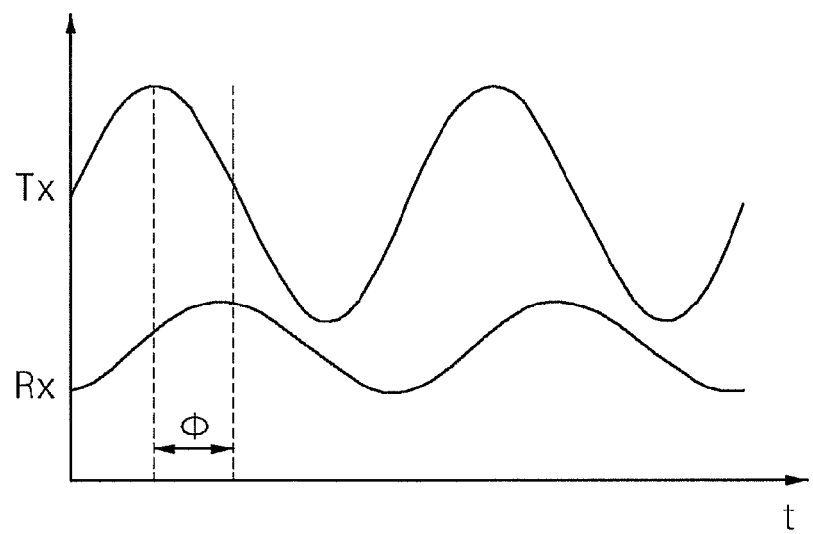

FIGS. 5A and 5B are views illustrating a distance detecting method of the distance detecting device of FIG. 3.

The controller 270 of the distance detecting device may calculate distance information based on phase difference, time difference, and pulse counting between an electric signal of an output beam and an electric signal of a received beam.

FIG. 5A illustrates a distance calculating method based on the time difference. In FIG. 5A, Tx indicates a pulse signal of an output beam, and Rx indicates a pulse signal of a received beam. As shown in FIG. 5A, a distance information level may be calculated based on the time difference Δt between the pulse signal of the output beam and the pulse signal of the received beam. For example, when the time difference is large, which means that the external target 40 is distant, the distance information level may be set to high, and therefore, a brightness level may be set to low. On the other hand, when the time difference is small, which means that the external target 40 is near, the distance information level may be set to low, and therefore, a brightness level may be set to high.

On the other hand, a pulse counting method is similar to FIG. 5A except that the pulse counting method uses the number of pulses (pulse counting) based on the difference between repetitive pulses corresponding to an output beam and repetitive pulses corresponding to a received beam. When the number of pulses is large, which means that the external target 40 is distant, the distance information level may be set to high. On the other hand, when the number of pulses is small, which means that the external target 40 is near, the distance information level may be set to low.

FIG. 5B illustrates a distance calculating method based on the phase difference. In FIG. 5B, Tx indicates a phase signal of an output beam, and Rx indicates a phase signal of a received beam. As shown in FIG. 5B, a distance information level may be calculated based on the phase difference Φ between the phase signal of the output beam and the phase signal of the received beam. For example, when the phase difference is large, which means that the external target 40 is distant, the distance information level may be set to high. On the other hand, when the phase difference is small, which means that the external target 40 is near, the distance information level may be set to low.

Setting of the distance information level is performed with respect to each region of the external target 40 while the horizontal scanning and the vertical scanning are performed with respect to the external target 40 as previously described. That is, it is possible to detect the distance information level with respect to each region of the external target 40.

Figure 6:
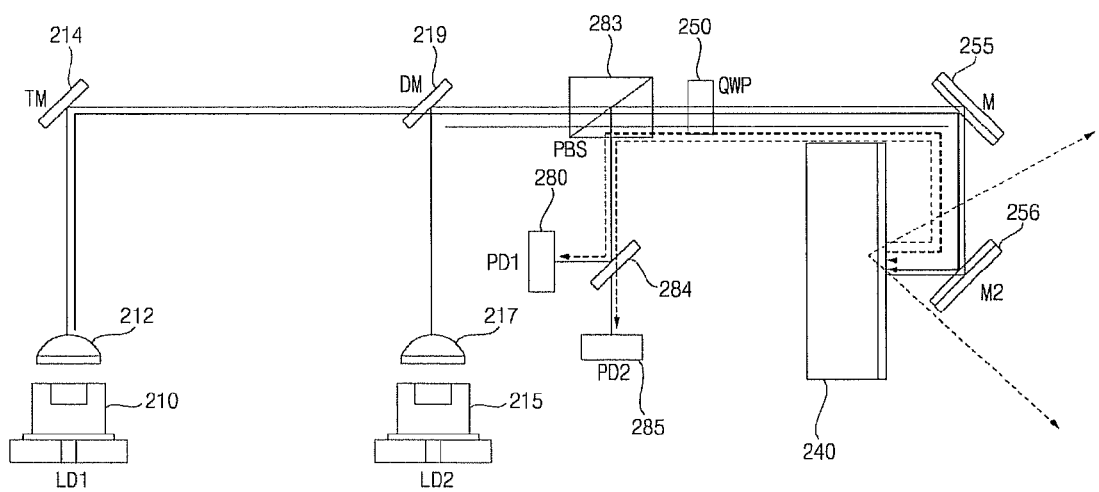
FIG. 6 is a view showing the internal structure of a distance detecting device according to another embodiment of the present invention.

FIG. 6 is a view showing the internal structure of a distance detecting device according to another embodiment of the present invention The distance detecting device of FIG. 6 is similar to that of FIG. 4 except that some units are omitted. That is, the distance detecting device of FIG. 6 uses a polarized beam splitting unit unlike that of FIG. 4.

Referring to FIG. 6, the distance detecting device may include a first light source 210, a first condensing unit 212, a light reflecting unit 214, a second light source 215, a second condensing unit 217, a light wavelength splitting unit 219, a scanner 240, a polarized beam converting unit 250, a second light reflecting unit 255, a third light reflecting unit 256, a first detecting unit 280, a polarized beam splitting unit 283, and a second light wavelength splitting unit 284.

The first condensing unit 212 and the second condensing unit 217 collimate output beams output from the first light source 210 and the second light source 215, respectively.

The first output beam, having passed through the first condensing unit 212, is reflected by the light reflecting unit 214 and is transmitted to the light wavelength splitting unit 219. On the other hand, the second output beam, having passed through the second condensing unit 217, is transmitted to the light wavelength splitting unit 219.

The light wavelength splitting unit 219 may transmit the first output beam and reflect the second output beam. Afterward, the light wavelength splitting unit 219 may transmit the first output beam and the second output beam to the scanner 240, specifically to the polarized beam splitting unit 283.

The polarized beam splitting unit 283 may transmit a beam of a P polarized state and reflect a beam of an S polarized state. Consequently, the polarized beam splitting unit 283 transmits the first and second output beams of a P polarized state to the scanner 240 and reflects first and second received beams of an S polarized state to the second light wavelength splitting unit 284.

The polarized beam converting unit 250 may convert polarization directions of the output beams and polarization directions of the received beams as shown in FIG. 4. The polarized beam converting unit 250 was previously described in detail with reference to FIG. 4, and therefore, a description thereof will be omitted.

Meanwhile, the second light wavelength splitting unit 284 may reflect or transmit light on a per wavelength basis. For example, the second light wavelength splitting unit 284 may be realized by a dichroic mirror. Specifically, the second light wavelength splitting unit 284 may reflect a beam of a first wavelength and transmit a beam of a second wavelength.

Consequently, the second light wavelength splitting unit 284 may reflect the first received beam to the first detecting unit 280 and transmit the second received beam to the scanner 240 to the second detecting unit 285.

On the other hand, the second light wavelength splitting unit 284 may transmit a beam of a first wavelength and reflect a beam of a second wavelength in the same manner as the light wavelength splitting unit 219. In this case, the positions of the first detecting unit and the second detecting unit may be changed.

The distance detecting device of FIG. 6, using a polarized beam splitting unit 283, may partially separate an optical path of the output beams and an optical path of the received beams from each other. Consequently, the light wavelength splitting unit 219 may transmit or reflect only the output beams, and the second light wavelength splitting unit 284 may transmit or reflect only the received beams. That is, the light wavelength splitting unit 219 may be designed to transmit only a P polarized beam, and the second light wavelength splitting unit 284 may be designed to transmit only an S polarized beam.

Figure 7:
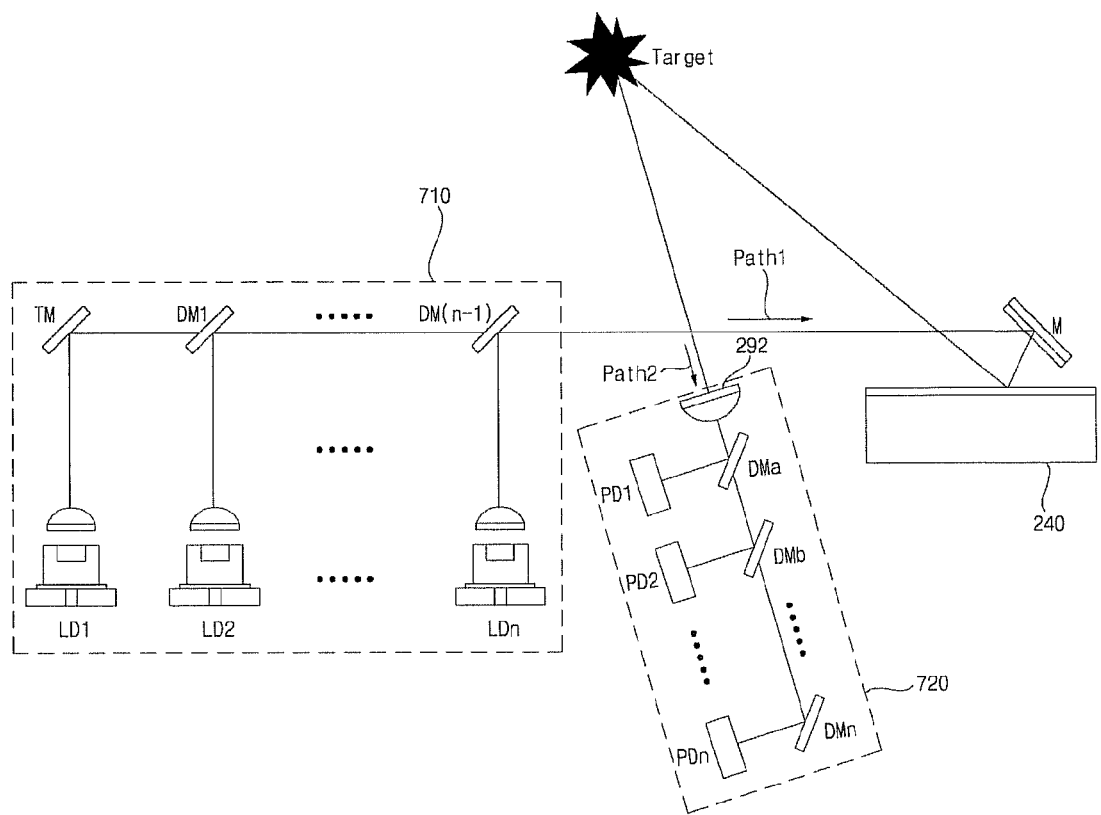
FIG. 7 is a view showing the internal structure of a distance detecting device according to yet another embodiment of the present invention.

FIG. 7 is a view showing the internal structure of a distance detecting device according to yet another embodiment of the present invention.

Referring to FIG. 7, the distance detecting device has a structure in which an optical path of an output beam and an optical path of a received beam are completely separated from each other unlike those of FIGS. 4 and 6.

Referring to FIG. 7, the distance detecting device uses a plurality of light sources, e.g. n light sources LD1, LD2, . . . , and LDn.

Consequently, a condensing unit, a light reflecting unit TM, and a plurality of light wavelength splitting units DM1, DM2, and DM(n−1) are used with respect to the n light sources.

A plurality of output beams output from the plurality of light sources is transmitted to the scanner 240 via the plurality of light wavelength splitting units. The scanner 240 outputs the plurality of output beams to an external target through horizontal scanning and vertical scanning.

Beams scattered or reflected by the external target are received through a light receiving unit 292, not the scanner 240. The received beams are transmitted to corresponding detecting units PD1, PD2, . . . , and PDn via n light wavelength splitting units DMa, DMb, . . . , and DMn.

Meanwhile, in FIG. 7, the output beams are output along path 1, the received beams are received along path 2. Consequently, the optical path of the output beams and the optical path of the received beams are completely separated from each other. That is, a light output unit 710 and a light receiving unit 720 are completely separated from each other.

As a result, the polarized beam converting unit 250 described with reference to FIGS. 4 and 6 may be used.

Meanwhile, since the optical paths are separated from each other, a beam output from the first light source may be a P polarized output beam of a first wavelength, and a beam output from the second light source may be an S polarized output beam of a first wavelength. That is, even beams having the same wavelength may be output from different light sources if the beams having the same wavelength have different polarization directions.

In this case, it is necessary for the light wavelength splitting units DMa and DMb of FIG. 7 to perform slitting based on the polarization, not based on the wavelength. For this reason, the light wavelength splitting units DMa and DMb may be replaced by polarized beam splitting units.

The polarized beam splitting unit DMa may reflect the P polarized output beam of the first wavelength to the first detecting unit PD1 and transmit the S polarized output beam of the first wavelength to the polarized beam splitting unit DMb.

Also, the light wavelength splitting unit DMb may reflect an S polarized received beam of the first wavelength to the second detecting unit PD2 and transmit a beam of the other wavelength to the light wavelength splitting unit DMc.

Hereinafter, various methods of improving resolution during scanning of the distance detecting device according to the embodiment of the present invention will be discussed.

Referring to FIG. 2A, the 2D scanner 240 receives the first output beam from the first light source 210 and the second output beam from the second light source 215 and output the first and second output beams to the external target as multiple beams. That is, the 2D scanner 240 performs horizontal scanning at a horizontal scanning frequency and vertical scanning at a vertical scanning frequency. At this time, the horizontal scanning and the vertical scanning may be progressively and repeatedly performed.

A horizontal scanning frequency fh of the first and second output beams output from the 2D scanner 240 may be defined as Mathematical expression 1 below.

$$fh = \text{number of vertical lines} \times \frac{fv}{2} \quad \text{[Mathematical expression 1]}$$

where, fv is a vertical scanning frequency.

For example, the vertical scanning frequency fv may be a frequency corresponding to a screen refresh rate, for example, 60 Hz.

The horizontal scanning frequency fh of interlaced scan may be half that of progressive scan.

In order to increase the horizontal scanning frequency, it is necessary to increase the size of the 2D scanner or considerably reducing the size of a mirror provided in the 2D scanner.

Meanwhile, Table 1 below shows a relationship among resolution, horizontal scanning frequency, and vertical scanning frequency.

TABLE 1

| No | Resolution | Horizontal scanning frequency | Vertical scanning frequency | Refresh rate |
|---|---|---|---|---|
| 1 | QVGA (320 × 240) | 7200 Hz | 60 Hz | 60 Hz |
| 2 | VGA (6400 × 480) | 14400 Hz | 60 Hz | 60 Hz |
| 3 | WVGA (800 × 480) | 14400 Hz | 60 Hz | 60 Hz |
| 4 | SVGA (800 × 600) | 18000 Hz | 60 Hz | 60 Hz |
| 5 | XGA (1024 × 768) | 23040 Hz | 60 Hz | 60 Hz |

It can be seen from Table 1 that the horizontal scanning frequency is increased as the resolution of an external target is increased.

Hereinafter, a description will be given of a distance detecting device that is capable of increasing the resolution of output beams (multiple beams) output to the external target without increasing the horizontal scanning frequency.

Figure 8:
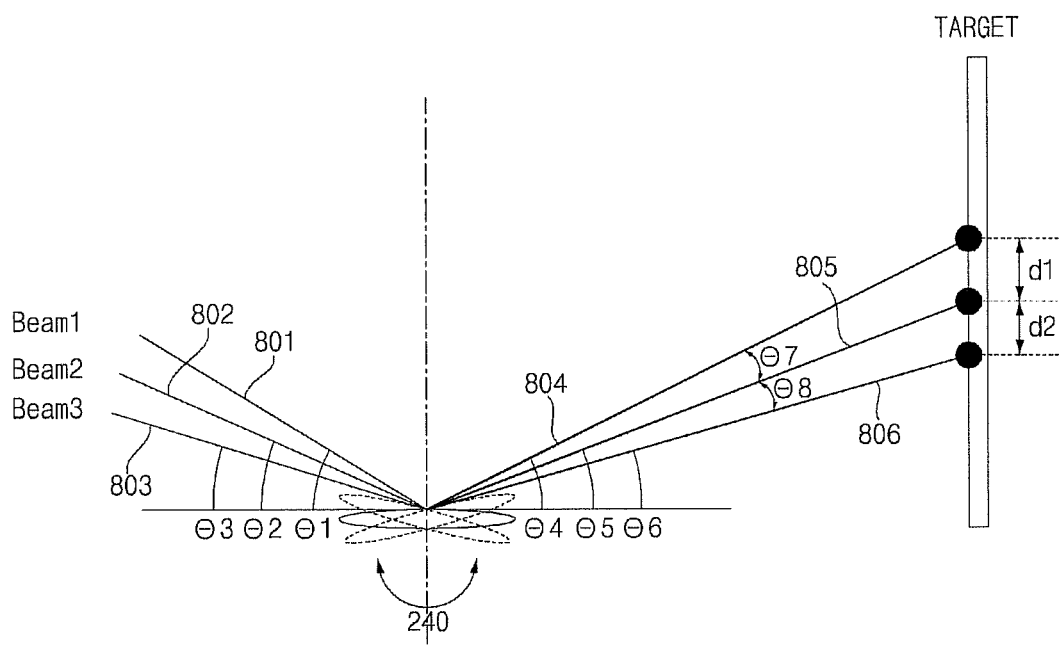
FIG. 8 is a view showing an embodiment in which output beams are scanned by the distance detecting device of FIG. 1.
Figure 9:
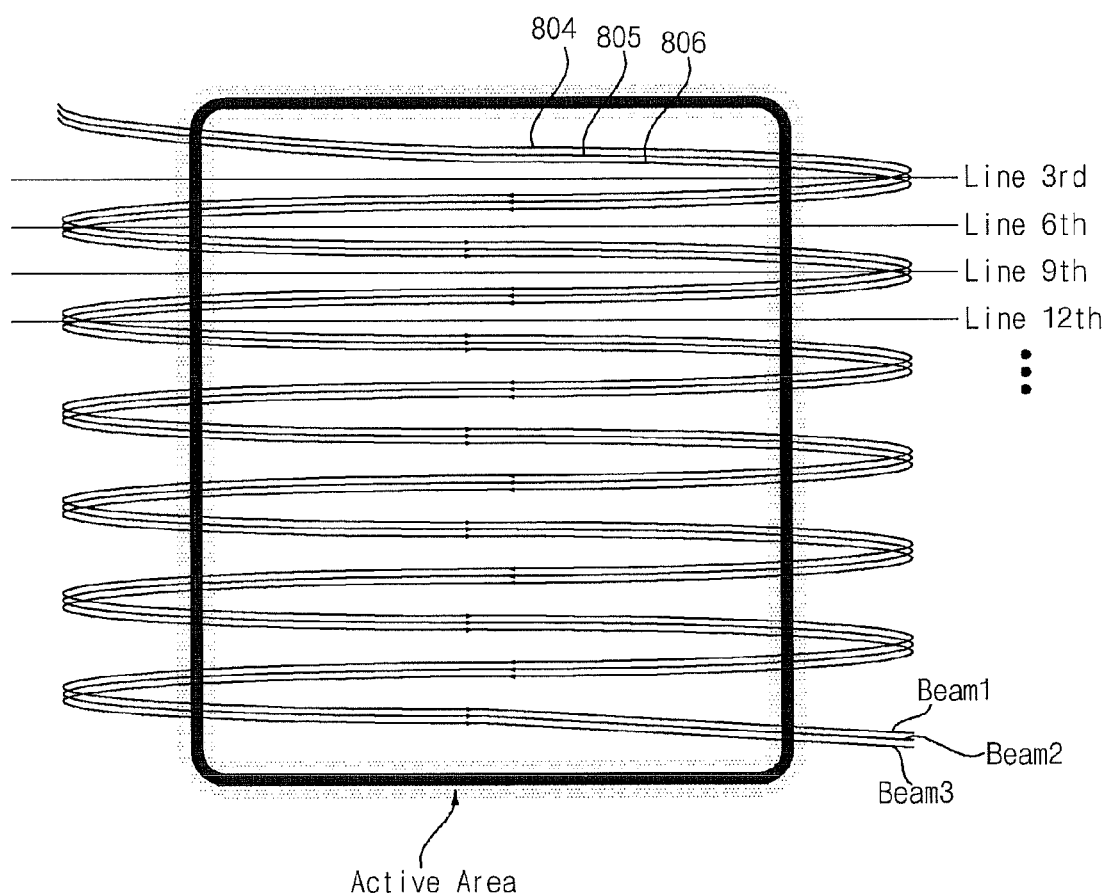
FIG. 9 is a view illustrating that output beams are scanned to an external target according to an output beam scanning method of FIG. 8.
Figure 10:
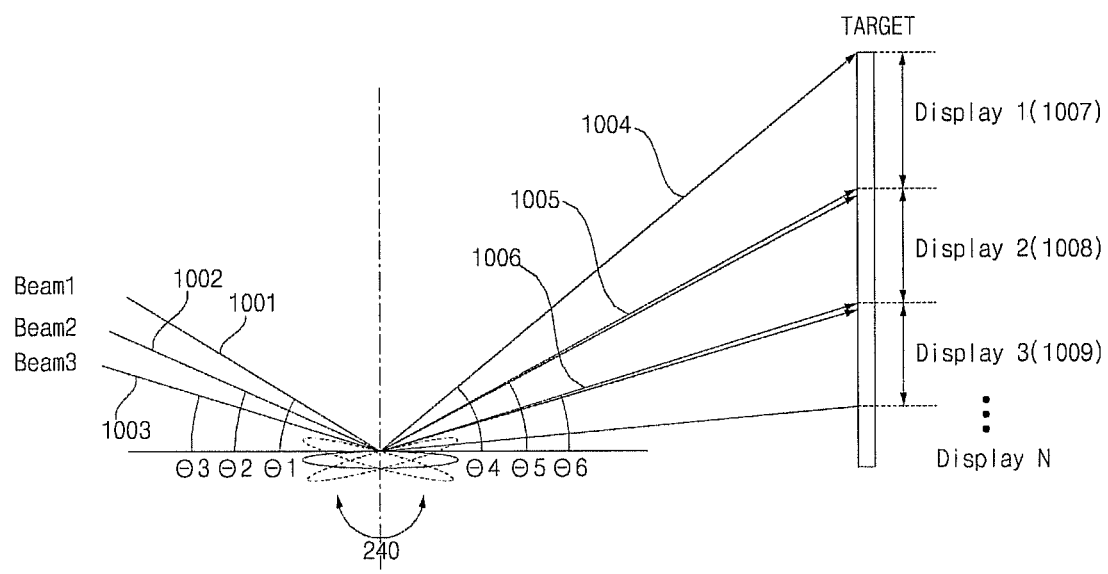
FIG. 10 is a view showing another embodiment in which output beams are scanned by the distance detecting device of FIG. 1.
Figure 11:
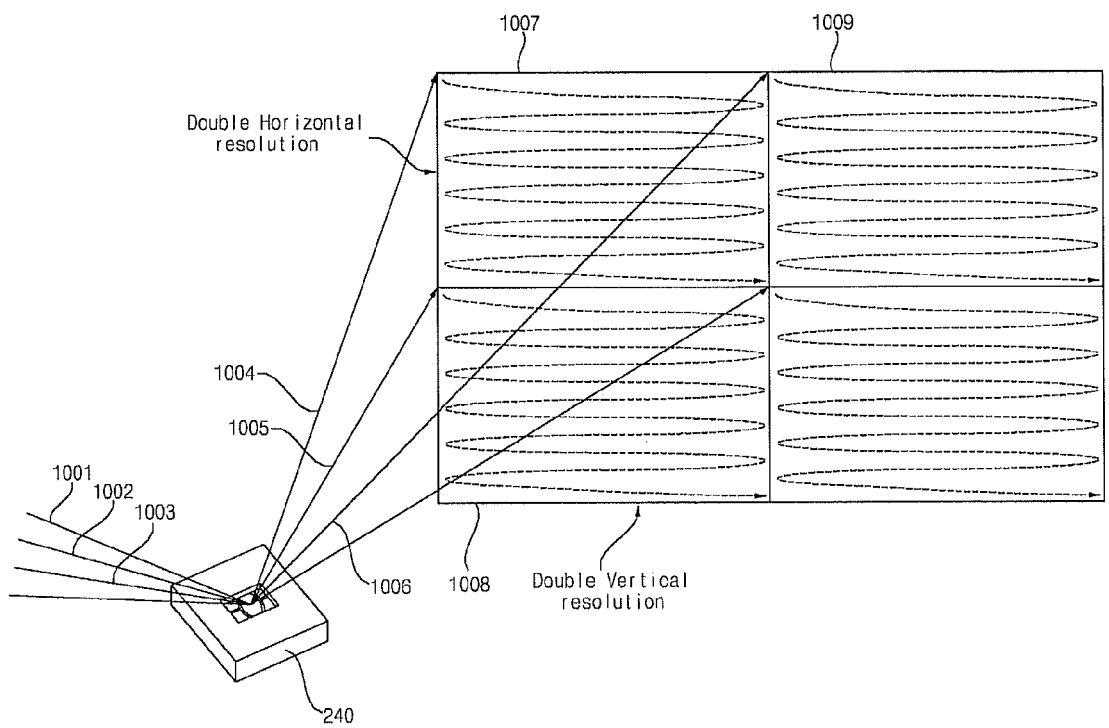
FIG. 11 is a view illustrating that output beams are scanned to an external target according to an output beam scanning method of FIG. 10.

FIGS. 8 and 9 illustrate horizontal scanning of output beams output from the respective light sources with respect to different horizontal lines, and FIGS. 10 and 11 illustrate horizontal scanning of output beams output from the respective light sources with respect to different scanning regions.

FIG. 8 is a view showing an embodiment in which output beams are scanned by the distance detecting device of FIG. 1.

Referring to FIG. 8, a plurality of output beams 801, 802, and 803 output from a plurality of light sources is incident upon the 2D scanner 240 of the distance detecting device according to the embodiment of the present invention at different incident angles.

In a case in which, for example, 3 output beams are output, a first output beam (Beam 1) 801 may be incident upon the 2D scanner 240 at an incident angle θ1, a second output beam (Beam 2) 802 may be incident upon the 2D scanner 240 at an incident angle θ2, and a third output beam (Beam 3) 803 may be incident upon the 2D scanner 240 at an incident angle θ3.

The 2D scanner 240 outputs the incident output beams to the external target as a plurality of output beams having different exit angles through 2D scanning. That is, the 2D scanner 240 may perform horizontal scanning with respect to the different horizontal lines using the output beams output from the respective light sources.

According to embodiments, the number of output beams scanned is not limited. Hereinafter, an embodiment using the 2D scanner 240 will be described. However, the present invention may be applied to a case in which one-dimensional (1D) scanner, such as a vertical or horizontal scanner.

For example, the 2D scanner 240 may output the first output beam 801 incident at the incident angle θ1 to the external target as a first output beam 804 having an exit angle θ4 to scan the external target.

Also, the 2D scanner 240 may output the second output beam 802 incident at the incident angle θ2 to the external target as a second output beam 805 having an exit angle θ5 to scan the external target.

Also, the 2D scanner 240 may output the third output beam 803 incident at the incident angle θ3 to the external target as a third output beam 806 having an exit angle θ6 to scan the external target.

At this time, the output beams 804, 805, and 806 may be scanned with respect to the external target. The output beams 804, 805, and 806 may be scanned at the same horizontal scanning frequency and vertical scanning frequency.

Also, intervals of the output beams 804, 805, and 806 output to the external target may be set in a per pixel basis. For example, the output beams 804, 805, and 806 output to the external target may be scanned at intervals of 1 pixel.

According to embodiments, in order to uniformalize the intervals of the output beams 804, 805, and 806, differences among exit angles of the output beams may be set to be uniform.

For example, in order to set the intervals of the output beams 804, 805, and 806 to 1 pixel, a difference value between the exit angle θ4 and the exit angle θ5 and a difference value between the exit angle θ5 and the exit angle θ6 may be set to be uniform.

FIG. 9 is a view illustrating that output beams are scanned to the external target according to the output beam scanning method of FIG. 8.

Referring to FIG. 9, the distance detecting device according to the embodiment of the present invention may output a plurality of output beams 804, 805, and 806 having different exit angles to the external target through 2D scanning.

Consequently, the distance detecting device according to the embodiment of the present invention may simultaneously scan output beams to form a plurality of scanning lines. Consequently, it is possible to obtain a depth of the external target at high resolution without increasing the horizontal scanning frequency.

For example, referring to Table 1 above, a resolution is 320×240 at a horizontal scanning frequency of 7200 Hz in a case in which the output beams are not scanned. On the other hand, in a case in which the output beams are simultaneously scanned to form a plurality of scanning lines according to the embodiment of the present invention, it is possible to increase a resolution to 800×600 at a horizontal scanning frequency of 7200 Hz.

Also, in the distance detecting device according to the embodiment of the present invention, output beams generated using a plurality of light sources are scanned to the target, and therefore, it is possible to obtain a depth of the external target at high resolution without modifying the scanner.

FIG. 10 is a view showing another embodiment in which output beams are scanned by the distance detecting device of FIG. 1.

Referring to FIG. 10, a plurality of output beams 1001, 1002, and 1003 output from a plurality of light sources is incident upon the 2D scanner 240 of the distance detecting device according to the embodiment of the present invention at different incident angles.

In a case in which, for example, 3 output beams are output, a first output beam (Beam 1) 1001 may be incident upon the 2D scanner 240 at an incident angle θ1, a second output beam (Beam 2) 1002 may be incident upon the 2D scanner 240 at an incident angle θ2, and a third output beam (Beam 3) 1003 may be incident upon the 2D scanner 240 at an incident angle θ3.

The 2D scanner 240 outputs the incident output beams to an external target as a plurality of output beams having different exit angles through 2D scanning. That is, the 2D scanner 240 may perform horizontal scanning with respect to the different scanning regions using the output beams output from the respective light sources.

According to embodiments, the number of output beams scanned is not limited. Hereinafter, an embodiment using the 2D scanner 240 will be described. However, the present invention may be applied to a case in which one-dimensional (1D) scanner, such as a vertical or horizontal scanner.

For example, the 2D scanner 240 may output the first output beam 1001 incident at the incident angle θ1 to the external target as a first output beam 1004 having an exit angle θ4 to scan the external target.

Also, the 2D scanner 240 may output the second output beam 1002 incident at the incident angle θ2 to the external target as a second output beam 1005 having an exit angle θ6 to scan the external target.

Also, the 2D scanner 240 may output the third output beam 1003 incident at the incident angle θ3 to the external target as a third output beam 1006 having an exit angle θ5 to scan the external target.

At this time, the output beams 1004, 1005, and 1006 may be simultaneously scanned with respect to the corresponding scanning regions 1007, 1008, and 1009. The output beams 1004, 1005, and 1006 may be scanned at the same horizontal scanning frequency and vertical scanning frequency.

Also, the scanning regions of the external target, to which the output beams 1004, 1005, and 1006 are output, may be variously set according to embodiments. Also, the exit angles of the output beams 1004, 1005, and 1006 may be set based on the scanning regions.

FIG. 11 is a view illustrating that output beams are scanned to an external target according to the output beam scanning method of FIG. 10.

Referring to FIG. 11, the distance detecting device according to the embodiment of the present invention may output a plurality of output beams 1004, 1005, and 1006 having different exit angles to corresponding scanning regions 1007, 1008, and 1009 of the external target through 2D scanning.

The output beams 1004, 1005, and 1006 may be simultaneously scanned with respect to the corresponding scanning regions 1007, 1008, and 1009 of the external target. The output beams 1004, 1005, and 1006 may be scanned at the same horizontal scanning frequency and vertical scanning frequency.

Consequently, the distance detecting device according to the embodiment of the present invention may simultaneously scan output beams to the respective scanning regions to form a plurality of scanning lines. Consequently, it is possible to obtain a depth of the external target at high resolution without increasing the horizontal scanning frequency.

Figure 12:
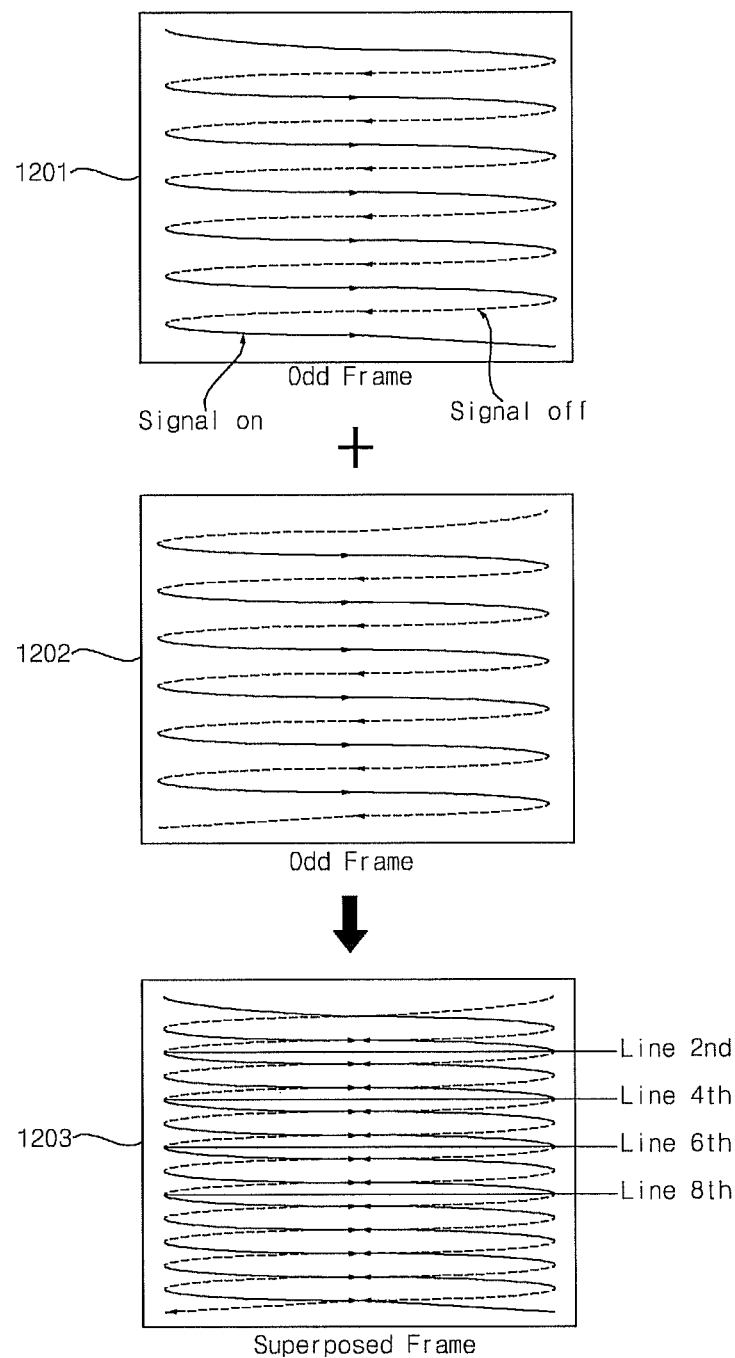
FIG. 12 is a view showing an embodiment in which a plurality of output beams is scanned by the distance detecting device of FIG. 1 in an interlaced fashion.

FIG. 12 is a view showing an embodiment in which a plurality of output beams is scanned by the distance detecting device of FIG. 1 in an interlaced fashion.

Referring to FIG. 12, the 2D scanner according to the embodiment of the present invention may scan a plurality of output beams to an odd frame 1201 and a plurality of output beams to an even frame 1202 to form a superposed frame 1203. During scanning of the odd frame 1201, odd lines are scanned. During scanning of the even frame 1202, even lines are scanned.

At this time, the 2D scanner may output the output beams in the same manner as shown in FIG. 8.

Also, line intervals of the output beams scanned to the odd frame 1201 and the even frame 1202 may be equal. For example, intervals of a plurality of output beams output to the odd frame 1201 and the even frame 1202 may be set on a per pixel basis. For example, a plurality of output beams scanned to the odd frame 1201 and the even frame 1202 may be scanned at intervals of 1 pixel.

In order to uniformalize the intervals of a plurality of output beams output to the odd frame 1201 and the even frame 1202, differences among exit angles of a plurality of output beams output from the 2D scanner 240 may be set to be uniform as previously described.

For example, in order to set the intervals of the output beams 804, 805, and 806 to 1 pixel, a difference value between the exit angle θ4 and the exit angle θ5 and a difference value between the exit angle θ5 and the exit angle θ6 may be set to be uniform.

In a case in which the superposed frame includes the odd frame and the even frame, scanning phase difference between the odd frame 1201 and the even frame 1202 may be π.

Consequently, the distance detecting device according to the embodiment of the present invention scans the plurality of output beams to the odd frame and the even frame to form the superposed frame. Consequently, the distance detecting device according to the embodiment of the present invention outputs the output beams in an interlaced scanning fashion at improved resolution, thereby increasing a refresh rate.

For example, in a conventional distance detecting device having a horizontal scanning frequency of 7200 Hz, a vertical scanning frequency (refresh rate) of 60 Hz, and 480 vertical lines, the refresh rate is reduced to increase a vertical resolution to 576 lines, or it is necessary to use a scanner having a vertical resolution of 576 lines.

When the refresh rate is reduced, however, depth detecting accuracy may be lowered.

In the distance detecting device according to the embodiment of the present invention, on the other hand, the output beams are scanned to the odd frame and the even frame to form the superposed frame. Consequently, it is possible to increase a vertical resolution to 576 lines while increasing a vertical scanning frequency (refresh rate) to 100 Hz at the same horizontal scanning frequency of 7200 Hz.

Consequently, the embodiment of the present invention has the effect of detecting depth of the external target at high resolution without increasing the horizontal scanning frequency.

Figure 13:
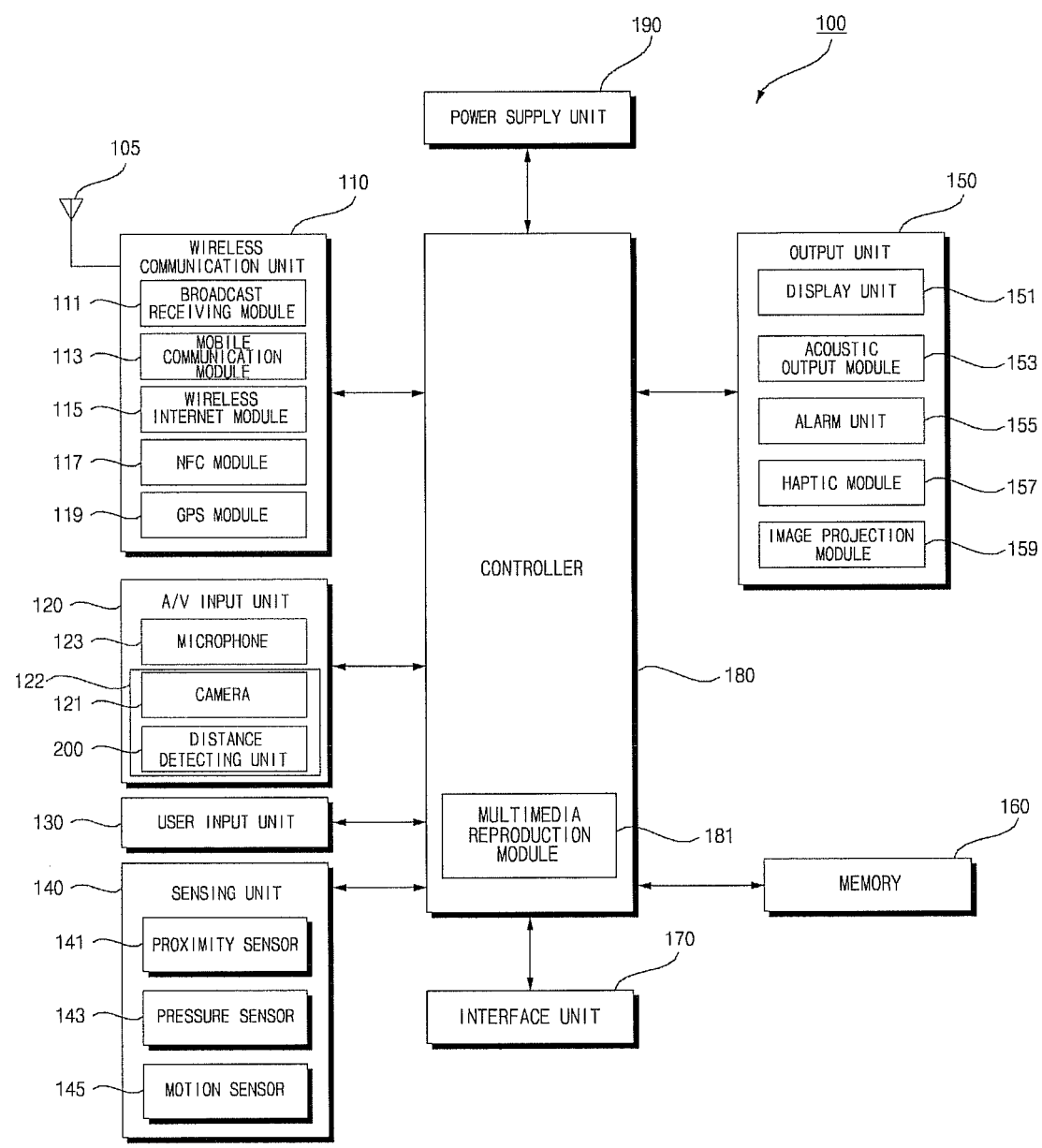
FIG. 13 is a block diagram showing the internal structure of a mobile terminal of FIG. 1.

FIG. 13 is a block diagram showing the internal structure of the mobile terminal of FIG. 1.

Referring to FIG. 13, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190.

The wireless communication unit 110 may include a broadcast receiving module 111, a mobile communication module 113, a wireless Internet module 115, a near field communication (NFC) module 117, and a global positioning system (GPS) module 119.

The broadcast receiving module 111 may receive a broadcast signal and/or broadcast-related information from an external broadcast management server through a broadcast channel. Here, the broadcast channel may include a satellite channel and a terrestrial channel.

The broadcast signal and/or broadcast-related information received through the broadcast receiving module 111 may be stored in the memory 160.

The mobile communication module 113 transmits and receives a wireless signal to and from at least one selected among from a base station, an external terminal, and a server on a mobile communication network. Here, the wireless signal may include a voice call signal, a video communication call signal, and various types of data based on text/multimedia message transmission and reception.

The wireless Internet module 115 is a module for wireless Internet connection. The wireless Internet module 115 may be mounted inside or outside the mobile terminal 100.

The NFC module 117 may perform a near field communication. In a case in which the NFC module 117 is within a predetermined distance from an NFC device (not shown), i.e. the NFC module 117 performs tagging, the NFC module 117 may receive data from the NFC device.

The GPS module 119 may receive position information from a plurality of GPS artificial satellites, The A/V input unit 120 is provided for audio signal or video signal input. The A/V input unit 120 may include a camera 121, a distance detecting unit 200, and a microphone 123.

The distance detecting unit 200 according to the embodiment of the present invention may be a subminiature distance detecting device as shown in FIG. 4, 6, or 7. Also, the distance detecting unit 200 according to the embodiment of the present invention may be a distance detecting device adopting the scanning method as shown in FIGS. 8 and 9 or FIGS. 10 and 11. Meanwhile, the distance detecting unit 200 may be provided in a 3D camera 122 together with the camera 121.

Meanwhile, the calculated distance information may be transmitted to the controller 180 so that calculated distance information is used to display, particularly, a 3D image during the reproduction of multimedia or is transmitted to the outside.

The user input unit 130 generates key input data input by a user to control the operation of the terminal. To this end, the user input unit 130 may include a key pad, a dome switch, and a touch pad (static pressure or electrostatic). Particularly in which the touch pad forms a layered structure together with a display unit 151, which will hereinafter be described, an assembly of the touch pad and the display unit 151 may be called a touch screen.

The sensing unit 140 may sense the present state of the mobile terminal 100, such as an open or closed state of the mobile terminal 100, the position of the mobile terminal 100, and whether user contact has been performed, to generate a sensing signal to control the operation of the mobile terminal 100.

The sensing unit 140 may include a proximity sensor 141, a pressure sensor 143, and a motion sensor 145. The motion sensor 145 may sense the motion or position of the mobile terminal 100 using an acceleration sensor, a gyro sensor, and a gravity sensor. In particular, the gyro sensor is a sensor to measure angular velocity. The gyro sensor may sense a direction (angle) rotated from a reference direction.

The output unit 150 may include a display unit 151, an acoustic output module 153, an alarm unit 155, and a haptic module 157.

The display unit 151 outputs, i.e., displays, information processed by the mobile terminal 100.

Meanwhile, in a case in which the display unit 151 and the touch pad are disposed as a layered structure to form a touch screen as previously described, the display unit 151 may be used as an input device that allows a user to input information by touch in addition to an output device.

The acoustic output module 153 outputs audio data received from the wireless communication unit 110 or stored in the memory 160. The acoustic output module 153 may include a speaker and a buzzer.

The alarm unit 155 outputs a signal to inform generation of an event of the mobile terminal 100. For example, the alarm unit 155 may output signal in the form of vibration.

The haptic module 157 generates various tactile effects that a user can feel. A representative example of the tactile effects generated by the haptic module 157 is a vibration effects.

The memory 160 may store a program for processing or controlling of the controller 180 or temporarily store input or output data (for example, phonebooks, messages, still images, motion images, etc.).

The interface unit 170 interfaces between the mobile terminal 100 and all external devices connected to the mobile terminal 100. The interface unit 170 may receive data or power from the external devices and transmit the received data or power to the respective components of the mobile terminal 100. Also, data from the mobile terminal 100 may be transmitted to the external devices via the interface unit 170.

The controller 180 controls operations of the respective components of the mobile terminal 100, thereby controlling overall operation of the mobile terminal 100. For example, the controller 180 may perform control or processing for voice communication, data communication, and video communication. Also, the controller 180 may include a multimedia reproduction module 181 to reproduce multimedia. The multimedia reproduction module 181 may be incorporated into the controller 180 in the form of hardware. Alternatively, the multimedia reproduction module 181 may be configured in the form of software separately from the controller 180. The operation of the controller 180 for multimedia reproduction will hereinafter be described in detail with reference to FIG. 14.

The power supply unit 190 supplies external power or internal power to the respective components of the mobile terminal 100 under control of the controller 180.

The mobile terminal 100 with the above-stated construction may be configured such that the mobile terminal 100 can be operated in a communication system that is capable of data through frames or packets, including a wired or wireless communication system and a satellite-based communication system.

The block diagram of FIG. 13 shows the components constituting the mobile terminal 100 according to the embodiment of the present invention. The respective components in the block diagram may be integrated, added, or omitted according to the specification of an actually realized mobile terminal 100. That is, two or more components may be combined into a single unit as needed, or one component may be divided into two or more components as needed. Also, functions performed by the respective blocks are illustrated to describe the embodiment of the present invention, and therefore, concrete operations or devices of the respective blocks do not restrict the right scope of the present invention.

Figure 14:
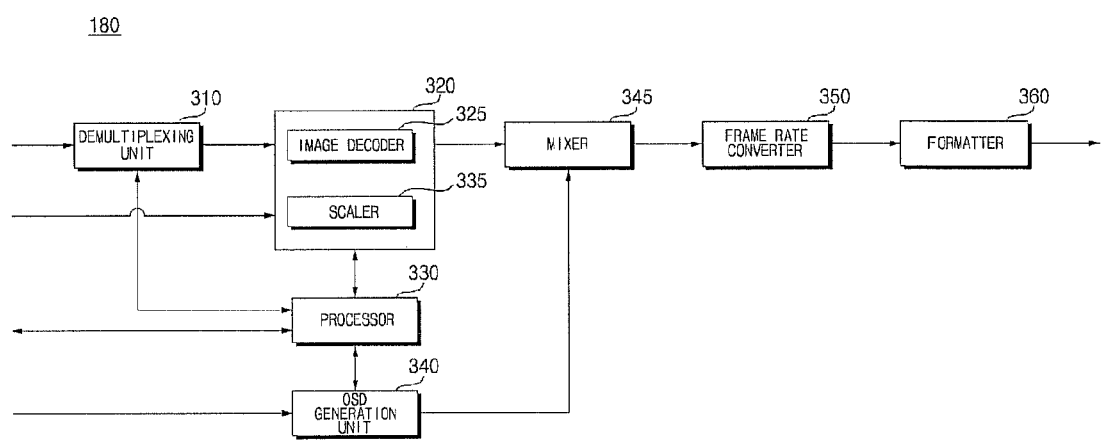
FIG. 14 is a block diagram showing the internal structure of a controller of FIG. 13.

FIG. 14 is a block diagram showing the internal structure of the controller of FIG. 13.

Referring to FIG. 14, the controller 180 according to the embodiment of the present invention may include a demultiplexing unit 310, an image processing unit 320, a processor 330, an on screen display (OSD) generation unit 340, a mixer 345, a frame rate converter 350, and a formatter 360 for multimedia reproduction. In addition, the controller 180 may include an audio processing unit (not shown) and a data processing unit (not shown).

The demultiplexing unit 310 demultiplexes an input stream. For example, in a case in which MPEG-2 TS is input, the demultiplexing unit 310 may demultiplex the input MPEG-2 TS into image, voice, and data signals. Here, the stream signal input to the demultiplexing unit 310 may be a stream signal output from the broadcast receiving module 111, the wireless Internet module 115, or the interface unit 170.

The image processing unit 320 may perform image processing with respect to the demultiplexed image signal. To this end, the image processing unit 320 may include an image decoder 325 and a scaler 335.

The image decoder 325 decodes the demultiplexed image signal. The scaler 335 may scale resolution of the decoded image signal in consideration of an image output from the display unit 151.

The image decoder 325 may include decoders of different standards.

The processor 330 may control overall operation of the mobile terminal 100 or the controller 180. For example, the processor 330 may control the broadcast receiving module 111 to tune a radio frequency (RF) broadcast corresponding to a channel selected by a user or a previously stored channel.

Also, the processor 330 may control the mobile terminal 100 according to user command input through the user input unit 130 or an internal program.

Also, the processor 330 may control data transmission to a network interface unit 135 or the interface unit 170.

Also, the processor 330 may control operations of the demultiplexing unit 310, the image processing unit 320, and the OSD generation unit 340 in the controller 180.

The OSD generation unit 340 generates an OSD signal according to user input or even without user input. For example, the OSD generation unit 340 may generate a signal to display various kinds of information in the form of graphs or text in an image output to the display unit 1551 based on a user input signal. The generated OSD signal may include various kinds of data, such as a user interface screen, various menu screens, widgets, and icons. Also, the generated OSD signal may include 2D objects or 3D objects.

The mixer 345 may mix the OSD signal generated by the OSD generation unit 340 and the image signal decoded through image processing of the image processing unit 320. The mixed image signals are transmitted to the frame rate converter 350.

The frame rate converter (RFC) 350 may convert a frame rate of the input image. On the other hand, the frame rate converter 350 may directly output the input image without frame rate conversion.

The formatter 360 may receive the signals mixed by the mixer 345, i.e. the OSD signal and the decoded image signal, change formats of the signals so that the signals are suitable for the display unit 151, and output the signals, the formats of which have been changed.

Also, the formatter 360 may divide a 2D image signal and a 3D image signal from each other for 3D image display. Also, the formatter 360 may change the format of the 3D image signal or convert the 2D image signal into the 3D image signal.

Meanwhile, the formatter 360 may use the distance information calculated by the distance detecting unit 200 during 3D image display. Specifically, when the size of a distance information level is large, which means that an external target is distant, the formatter 360 may set a depth information level to low. That is, the formatter 360 may set the depth information level so that the depth information level is inversely proportional to the distance information level. Also, the formatter 360 may change a 2D image into a 3D image using the depth information and output the 3D image.

When the external target is distant, and the distance information level is high, therefore, the formatter 360 may set the depth information level to low so that the external target is depressed during 3D image display. On the other hand, when the external target is near, and the distance information level is low, therefore, the formatter 360 may set the depth information level to high so that the external target protrudes during 3D image display.

Meanwhile, the audio processing unit (not shown) in the controller 180 may perform voice processing with respect to the demultiplexed voice signal. To this end, the audio processing unit (not shown) may include various decoders.

Also, the audio processing unit (not shown) in the controller 180 may adjust base, treble, and volume.

In FIG. 14, the signals from the OSD generation unit 340 and the image processing unit 320 are mixed by the mixer 345 and are 3D processed by the formatter 360. However, the present invention is not limited thereto. For example, the mixer may be disposed after the formatter. That is, the output of the image processing unit 320 may be 3D processed by the formatter 360, the OSD generation unit 340 may perform 3D processing together with OSD generation, and the respectively processed 3D signals may be mixed by the mixer 345.

The block diagram of FIG. 14 shows the components constituting the controller 180 according to the embodiment of the present invention. The respective components in the block diagram may be integrated, added, or omitted according to the specification of an actually realized controller 180.

In particular, the frame rate converter 350 and the formatter 360 may not be disposed in the controller 180 but may be separately provided.

Constructions and methods of the embodiments as previously described are not limitedly applied to the image processing apparatus including the distance detecting device according to the embodiment of the present invention. All or some of the embodiments may be selectively combined so that the embodiments can be variously modified.

As is apparent from the above description, a distance detecting device according to an embodiment of the present invention or an image processing apparatus including the distance detecting device outputs a plurality of beams to an external target using a plurality of light sources having different wavelengths, receives a plurality of beams scattered or reflected by the external target, and detects the distance from the external target using the difference between the output beams and the received beams.

In particular, a 2D scanner capable of progressively performing first directional scanning and second directional scanning is used to output a plurality of output beams to the outside. Consequently, it is not necessary to use a plurality of scanners, and therefore, it is possible to miniaturize the distance detecting device. Also, it is possible to reduce manufacturing cost.

Also, a laser diode is used as each light source. Consequently, it is possible to increase a measurable distance and to improve distance resolution.

Also, since a plurality of light sources is used, it is possible to adjust the intensity of light output from the light sources so that the output light does not have a harmful influence on a human body and to improve accuracy in detecting distance information.

Also, in a case in which a plurality of light sources having different wavelengths is used, polarization directions of output beams and received beams are differently set so that a path of the output beams and a path of the received beams overlap, thereby miniaturizing the distance detecting device.

Also, when polarization directions of output beams and received beams are differently set in a case in which a plurality of light sources having different wavelengths is used, it is possible to use only a polarized beam splitting unit that can be commonly used for the output beams and the received beams, thereby reducing manufacturing cost.

In accordance with an embodiment of the present invention, output beams output from the respective light sources are horizontally scanned with respect to different horizontal lines. Consequently, it is possible to obtain a depth of an external target at high resolution without increasing a horizontal scanning frequency.

In accordance with another embodiment of the present invention, output beams output from the respective light sources are scanned with respect to different scanning regions. Consequently, it is possible to obtain a depth of an external target at high resolution without increasing a horizontal scanning frequency.

A distance detecting device according to yet another embodiment of the present invention or an image processing apparatus including the distance detecting device outputs a plurality of output beams to an external target using first and second light sources having the same wavelengths and different polarization directions, receives a plurality of received beams scattered or reflected by the external target, and detects the distance from the external target using the difference between the output beams and the received beams. In this case, a path of the output beams and a path of the received beams are separated from each other, and it is possible to improve accuracy in detecting the distance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distance detector comprising:
a first light source to output a first output beam and a second light source to output a second output beam, wherein the first output beam has a first wavelength and the second output beam has a second wavelength, and wherein the first wavelength is different from the second wavelength;
a scanner to progressively and repeatedly perform first directional scanning and second directional scanning to output the first output beam and the second output beam to an external target within a region that can be scanned;
a first detector to convert a first received beam corresponding to the first output beam into a first electric signal;

a second detector to convert a second received beam corresponding to the second output beam into a second electric signal;

a controller to detect a distance from the external target based on the first electric signal and the second electric signal;

a polarized beam splitter provided between the first light source and the first detector and between the second light source and the second detector to transmit the first and second output beams to the scanner and to transmit the first and second received beams to the first and second detectors;

a first light wavelength splitter provided between the first and second light sources and the polarized beam splitter to transmit the first output beam to the scanner and to reflect the second output beam to the scanner; and a second light wavelength splitter provided between the first and second detectors and the polarized beam splitter to transmit the first received beam to the first detector and to transmit the second received beam to the second detector, wherein the controller calculates a first distance information based on a first phase difference, a first time difference, and a first pulse count between an electric signal of the first output beam and the first electric signal of the first received beam, wherein the controller calculates a second distance information based on a second phase difference, a second time difference, and a second pulse count between an electric signal of the second output beam and the second electric signal of the second received beam, and wherein the controller calculates the distance using the first distance information and the second distance information.

2. The distance detector according to claim 1, further including a polarized beam converter to transmit the first and second output beams to the scanner and to convert polarization directions of the first and second received beams so that the polarization directions of the first and second received beams are different from those of the first and second output beams.

3. The distance detector according to claim 2, wherein the polarized beam converter converts the first and second output beams from first directionally polarized beams into circularly polarized beams and converts the first and second received beams from circularly polarized beams into second directionally polarized beams.

4. The distance detector according to claim 1, further including a light receiver to receive the first received beam and the second received beam corresponding to the first output beam and the second output beam, respectively, from an outside.

5. The distance detector according to claim 1, wherein the scanner outputs the first and second output beams and receives the first and second received beams.

6. The distance detector according to claim 1, wherein the scanner outputs the first output beam and the second output beam to the external target so that the first output beam and the second output beam are horizontally scanned with respect to different horizontal lines.

7. The distance detector according to claim 1, wherein the scanner outputs the first output beam and the second output beam to the external target so that the first output beam and the second output beam are horizontally and vertically scanned with respect to different scanning regions.

8. A distance detector comprising:
a first light source to output a first output beam and a second light source to output a second output beam, wherein the first output beam has a first wavelength and a first polarization direction, wherein the second output beam has a second wavelength and a second polarization direction, wherein the first wavelength is identical to the second wavelength, and wherein the first polarization direction is different from the second polarization direction;

a scanner to progressively and repeatedly perform first directional scanning and second directional scanning to output the first output beam and the second output beam to an external target within a region that can be scanned;

a light receiver to receive a first received beam and a second received beam, wherein the first received beam corresponds to the first output beam and the second received beam corresponds to the second output beam from the region;

a first detector to convert the first received beam into a first electric signal;

a second detector to convert the second received beam into a second electric signal; and a controller to detect a distance from the external target based on the first electric signal and the second electric signal;

a first polarized beam splitter provided between the first light source and the second light source to transmit the first output beam to the scanner and to reflect the second output beam to the scanner; and a second polarized beam splitter provided between the light receiver and the first detector to reflect the first received beam to the first detector and to transmit the second received beam, wherein the controller calculates a first distance information based on a first phase difference, a first time difference, and a first pulse count between an electric signal of the first output beam and the first electric signal of the first received beam, wherein the controller calculates a second distance information based on a second phase difference, a second time difference, and a second pulse count between an electric signal of the second output beam and the second electric signal of the second received beam, and wherein the controller calculates the distance using the first distance information and the second distance information.

9. The distance detector according to claim 8, wherein an optical path of the first and second output beams is separated from an optical path of the first and second received beams.

10. The distance detector according to claim 8, wherein the scanner outputs the first output beam and the second output beam to the external target so that the first output beam and the second output beam are horizontally scanned with respect to different horizontal lines.

11. The distance detector according to claim 8, wherein the scanner outputs the first output beam and the second output beam to the external target so that the first output beam and the second output beam are horizontally and vertically scanned with respect to different scanning regions.

* * * * *